(12) United States Patent
Schulte et al.

(10) Patent No.: US 11,709,223 B2
(45) Date of Patent: Jul. 25, 2023

(54) RADAR DEVICE, SPECIFICALLY FOR A VEHICLE

(71) Applicant: Hella GmbH & Co. KGaA, Lippstadt (DE)

(72) Inventors: Michael Schulte, Lippstadt (DE); Michael Talhof, Paderborn (DE); Udo Wallmeier, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 254 days.

(21) Appl. No.: 16/977,382

(22) PCT Filed: Feb. 26, 2019

(86) PCT No.: PCT/EP2019/054743
§ 371 (c)(1),
(2) Date: Sep. 1, 2020

(87) PCT Pub. No.: WO2019/174906
PCT Pub. Date: Sep. 19, 2019

(65) Prior Publication Data
US 2021/0063529 A1 Mar. 4, 2021

(30) Foreign Application Priority Data

Mar. 13, 2018 (DE) .................... 10 2018 105 702.4

(51) Int. Cl.
*G01S 7/03* (2006.01)
*G01S 13/931* (2020.01)
*G01S 7/02* (2006.01)

(52) U.S. Cl.
CPC ............ *G01S 7/032* (2013.01); *G01S 13/931* (2013.01); *G01S 7/028* (2021.05)

(58) Field of Classification Search
CPC ......... G01S 7/032; G01S 13/931; G01S 7/028
(Continued)

(56) References Cited

U.S. PATENT DOCUMENTS

| 4,195,114 A * | 3/1980 | Crosby | ..................... B29B 9/12 |
| | | | 428/407 |
| 7,180,440 B2 * | 2/2007 | Schmidt | ................. G01V 3/088 |
| | | | 342/175 |

(Continued)

FOREIGN PATENT DOCUMENTS

| DE | 102006023123 A1 * | 1/2007 | ............ G01S 19/36 |
| DE | 102006023123 A1 | 1/2007 | |

(Continued)

*Primary Examiner* — Nuzhat Pervin
(74) *Attorney, Agent, or Firm* — Husch Blackwell LLP

(57) ABSTRACT

A radar device for a vehicle is provided, comprising a housing with a first housing part and a second housing part (2). The housing parts are connected to each other and form the boundaries of a closed recording space. The radar device also includes a circuit carrier accommodated within the recording space. The circuit carrier features at least one transmission antenna device for the transmission of radar beams, at least one receiving antenna device for receiving radar beams, and features high-frequency electronic circuit devices and low-frequency electronic circuit devices. At least one of the first of the two housing parts is a two-component plastic injection-molded parts, and one of the first of the two components has at least a three times higher thermal conductivity than a second one of the two components.

9 Claims, 5 Drawing Sheets

(58) Field of Classification Search
USPC .......................................................... 342/175
See application file for complete search history.

(56) References Cited

U.S. PATENT DOCUMENTS

| | | | | |
|---|---|---|---|---|
| 9,397,820 B2* | 7/2016 | Schulz | ................... | H04K 3/226 |
| 9,490,533 B2* | 11/2016 | Sanford | ................. | H01Q 15/14 |
| 9,524,597 B2* | 12/2016 | Ricci | ..................... | H04W 76/11 |
| 9,525,206 B2* | 12/2016 | Abe | ..................... | H01Q 21/0037 |
| 9,543,635 B2* | 1/2017 | Schulz | ................... | H01Q 19/12 |
| 9,901,252 B2* | 2/2018 | Tran | ......................... | A61B 7/00 |
| 10,019,002 B2* | 7/2018 | Harnett | .................... | G01S 15/96 |
| 10,527,722 B2* | 1/2020 | Carlson | .................. | B62J 50/225 |
| 10,965,014 B2* | 3/2021 | Beer | ...................... | G01S 13/931 |
| 2005/0224246 A1* | 10/2005 | Gottwald | ............... | H01Q 9/0414 |
| | | | | 174/359 |
| 2005/0224346 A1* | 10/2005 | Holm-Kennedy | .......................... | |
| | | | | G01N 33/54373 |
| | | | | 204/414 |
| 2009/0026616 A1* | 1/2009 | Dertinger | .............. | B81B 7/0006 |
| | | | | 438/618 |
| 2010/0238068 A1* | 9/2010 | Seidel | .................... | G01S 7/032 |
| | | | | 342/175 |
| 2014/0375490 A1* | 12/2014 | Pfitzenmaier | ........... | G01S 7/032 |
| | | | | 342/4 |
| 2015/0229023 A1* | 8/2015 | Abe | ........................ | H01Q 5/22 |
| | | | | 342/368 |
| 2016/0033621 A1* | 2/2016 | Ottenhues | ................. | G01S 7/03 |
| | | | | 342/175 |
| 2016/0218420 A1* | 7/2016 | Leung | ................... | G01S 13/931 |
| 2017/0146637 A1* | 5/2017 | Schwendimann | ........ | G01S 7/03 |
| 2017/0285163 A1* | 10/2017 | Rieke | ..................... | H01Q 17/00 |
| 2018/0136312 A1* | 5/2018 | Fetterman | ............. | G01S 13/931 |
| 2019/0207302 A1* | 7/2019 | Yamada | ................. | H01Q 1/425 |
| 2019/0265329 A1* | 8/2019 | Mauch | .................... | G01S 7/023 |

FOREIGN PATENT DOCUMENTS

| | | | | | |
|---|---|---|---|---|---|
| DE | 102012216918 A1 | * | 3/2014 | ......... | F01M 11/0004 |
| DE | 102012216918 A1 | | 3/2014 | | |
| DE | 102013104147 A1 | * | 10/2014 | .......... | G01S 13/931 |
| DE | 102013104147 A1 | | 10/2014 | | |
| DE | 102015223243 A1 | * | 5/2017 | .............. | G01S 7/02 |
| DE | 102015223243 A1 | | 5/2017 | | |
| EP | 0957371 B1 | * | 1/2004 | .............. | G01S 7/03 |
| EP | 3070784 A1 | * | 9/2016 | .......... | G01S 13/931 |
| EP | 3070784 A1 | | 9/2016 | | |
| WO | WO-2005081015 A1 | * | 9/2005 | ............. | G01S 13/86 |

* cited by examiner

RADAR DEVICE, SPECIFICALLY FOR A VEHICLE

CROSS REFERENCE

This application claims priority to PCT Application No. PCT/EP2019/054743, filed Feb. 26, 2019, which itself claims priority to German Application 10 2018 105702.4, filed Mar. 13, 2018, the entirety of both of which are hereby incorporated by reference.

FIELD OF THE INVENTION

The invention relates to a radar device, specifically for a vehicle comprising a housing with a first housing part and with a second housing part, where the housing parts are connected to each other and form the boundaries of closed recording space, a circuit carrier that is accommodated within the recording space, where the circuit carrier features at least one transmission antenna device for the transmission of radar beams, at least one receiving antenna device for receiving radar beams and features high-frequency electronic circuit devices and low-frequency electronic circuit devices.

BACKGROUND

A radar device with these features is known from document DE 10 2013 104 147 A1. The known radar device is operated in a frequency range of 24 GHz. In contrast, the radar devices under development are operated in a frequency range of 77 GHz. Firstly due to greater power loss and secondly to smaller sensor dimensions, operation in this frequency range leads to greater heat development in the housing. Studies by the applicant have shown that the thermal power density increases three to fourfold from approx. 16 mW/cm$^3$ to approx. 60 mW/cm$^3$. With the concepts described to date, also in document DE 10 2013 104 147 A1, on cooling it is impossible to achieve sufficient thermal transport out of the housing.

SUMMARY OF THE INVENTION

The inventors consequently faced the technical problem of proposing a radar device that can feature a compact housing despite a high power density and in which the two housing parts are made of plastic. Housing parts made of plastic have the advantage over plastic/metal as a combination of materials in that they can be bonded to each other by means of a plastic welding process. The high demands on density can be more easily met with a welded sensor housing (plastic/plastic) than with, for example, a glued housing (plastic/metal).

The inventors solved this technical issue by at least one of the two housing parts being a multi-component plastic injection-molded part, where one of the first components has an at least three times, specifically at least a five times higher, thermal conductivity than a second one of the components. The thermal conductivity of a typical plastic may be around 0.3 W/(m K).

Implementing the first housing part as a multi-component plastic injection-molded part, specifically as a two-component plastic injection-molded part makes it possible to form a thermal bridge in the housing part that firstly ensures sufficient heat dissipation. Secondly, this thermal bridge formed by means of the first component makes it possible to determine an area of the housing through which the heat is dissipated into the environment of the housing. This is specifically an advantage when a radar device in accordance with the invention features a bracket made of a material manufactured from a material with good thermal conductivity, such as a metal or a thermally conductive plastic. The housing of the radar device can be fastened to this bracket, notably in such a way that the area of the first housing part produced by the first component connects to the bracket or makes contact with the bracket. The bracket may consists fully or in part of a metal such as aluminum or steel or of a thermally conductive plastic.

In a radar device in accordance with the invention, the first area formed by the first component and the second area formed by the second component of the first housing part may interlock. This makes it possible for the first area and the second area to be connected to each other in a form-locking manner. In addition to the form-locking connection, there is also a firmly bonded connection through the multi-component plastic injection molding.

Preferentially, the first area is embedded in the second area, i.e. the first area is surrounded by the second area. The first area may interlock in a form-locking manner with the second area or vice versa.

The first area may be essentially designed to be disk-like and from a top view of the topside or the bottom is designed to be round, specifically circular, elliptical or oval. Preferentially, the first area does not have any corners, specifically no 90° corners. Corners may have the disadvantage that higher mechanical tensions arise in such corners where temperature fluctuations occur, which may lead to damage to the connection between the first component of the first area and the second component of the second area. As a consequence of this, leaks may occur in the connection.

One edge of the first area of the first housing part may be thicker than an inner section of the first area separated off from the edge. The edge may feature structures that act as a form-locking connection with the second area.

The first area may feature ribs on one outside surface of the housing. The ribs may act to dissipate heat from the housing.

The first component may contain filler materials, such as graphites. The filler materials may or may not be electrically conductive.

The first area may be firmly bonded with a component that is arranged inside the housing. In this way, it is possible for the first area to be connected, for example, with a shielding body and/or with a thermally conductive medium. The connection can be produced by means of adhesive. The thermally conductive medium may be a gap filler or a gap pad.

The second area of the first housing part may be transparent, specifically laser transparent.

It is possible for there to be a gap filler, gap pad and/or an adhesive between the shielding body, preferentially made of metal that is also a thermally conductive medium, and the first more thermally conductive area of the first housing part.

A radar device in accordance with the invention may feature, within the recording space, at least one shielding device where the shielding device is designed to shield against electromagnetic radiation. A radar device in accordance with the invention may feature within the recording area a radar radiation absorption body that preferentially takes the form of a foam body.

One of the two housing parts may include a means of plugged connection, e.g. a connector or a socket that is molded onto the housing part in one piece.

The housing part, specifically the first housing part, may be manufactured by means of injection molding. In this respect, the overmolding of the first area, i.e. the production of the second area of the first housing part must take place directly or indirectly no more than one minute after the injection molding of the first area to create a good firmly bonded connection. Dynamic tempering inside and outside of the tooling may bring about an improvement in adhesion during manufacturing of the component. Similarly, close-to-contour tempering may be performed.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
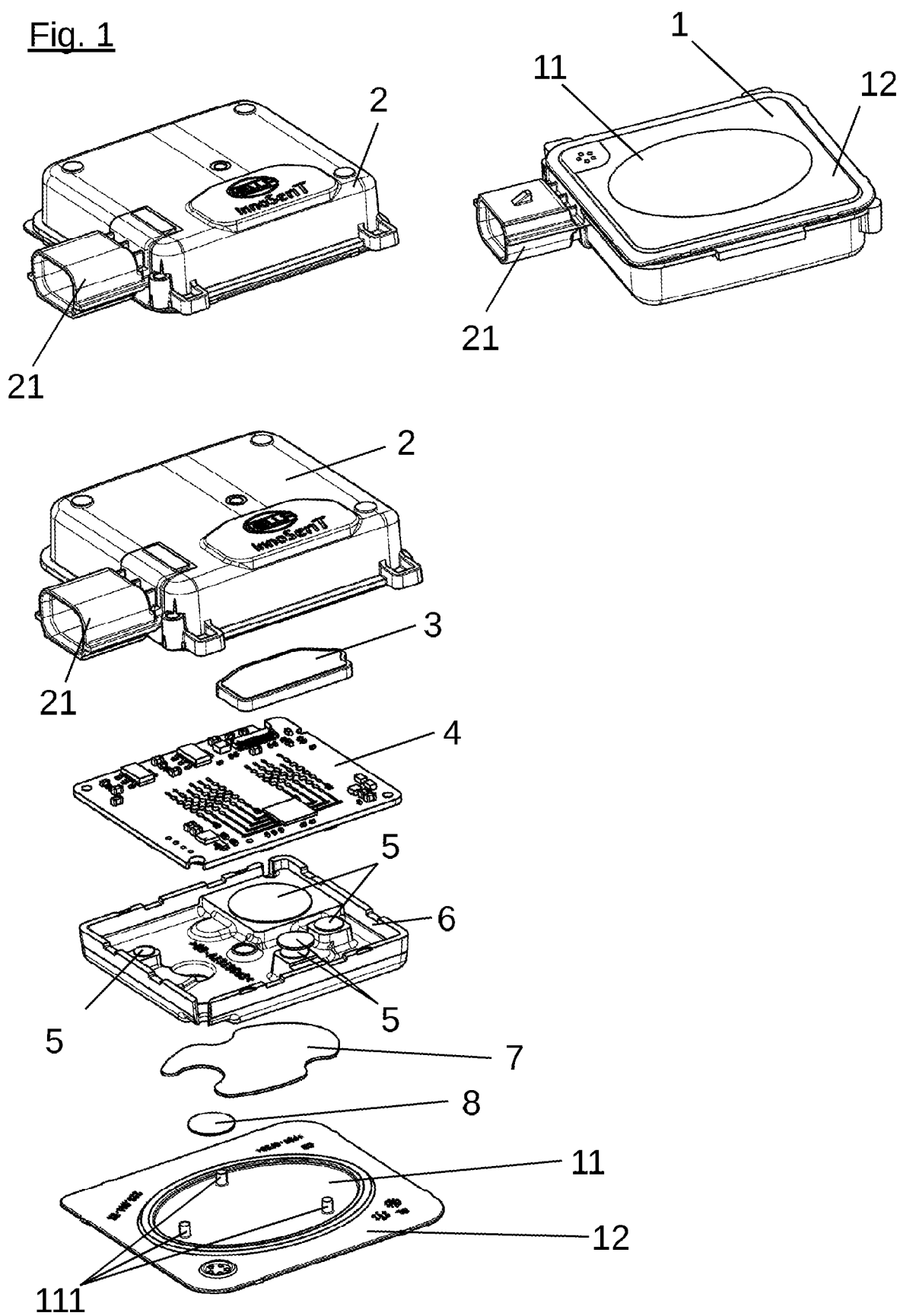
FIG. 1 is an exploded view of a first radar device in accordance with the invention.
Figure 2:
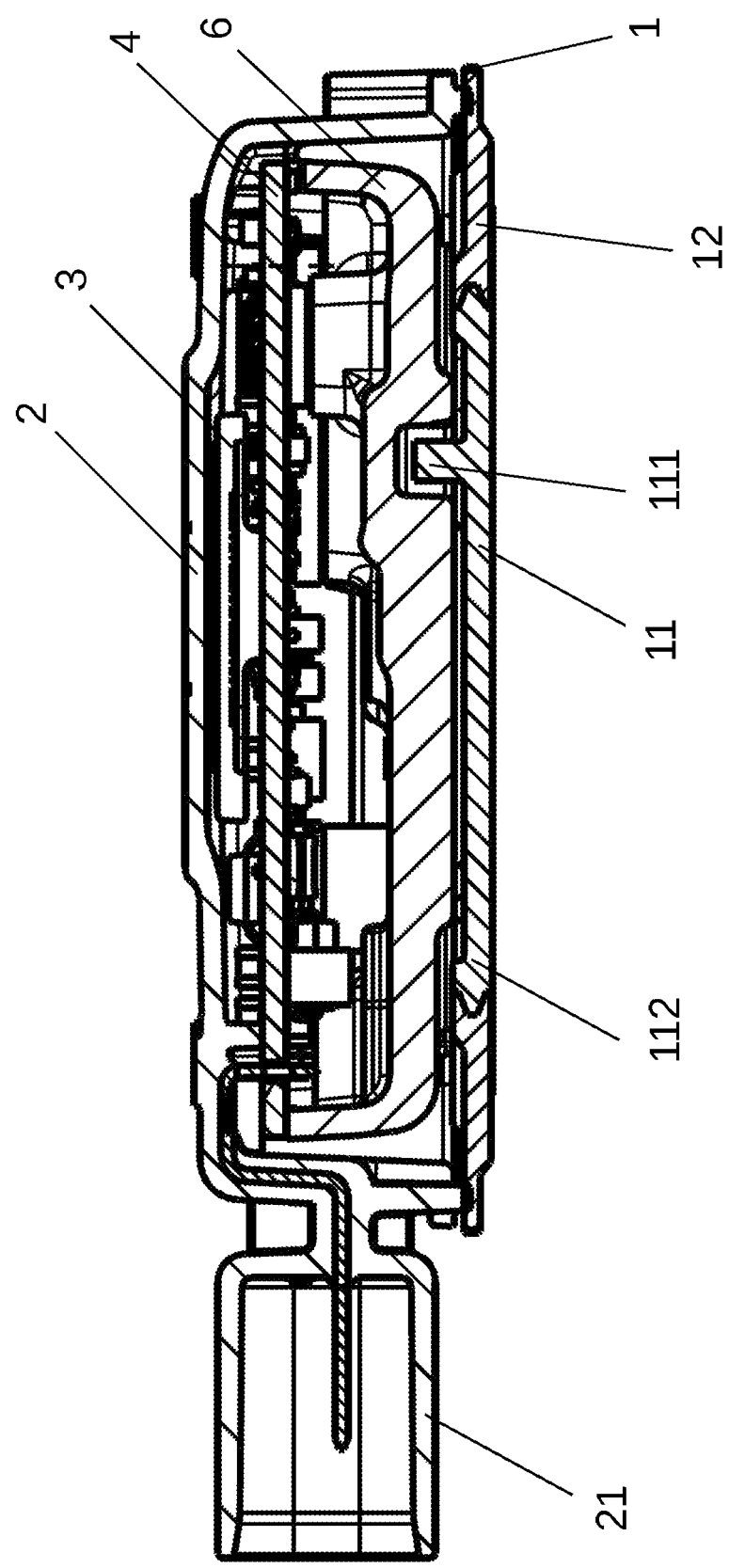
FIG. 2 is a cross-section through the first radar device.
Figure 3:
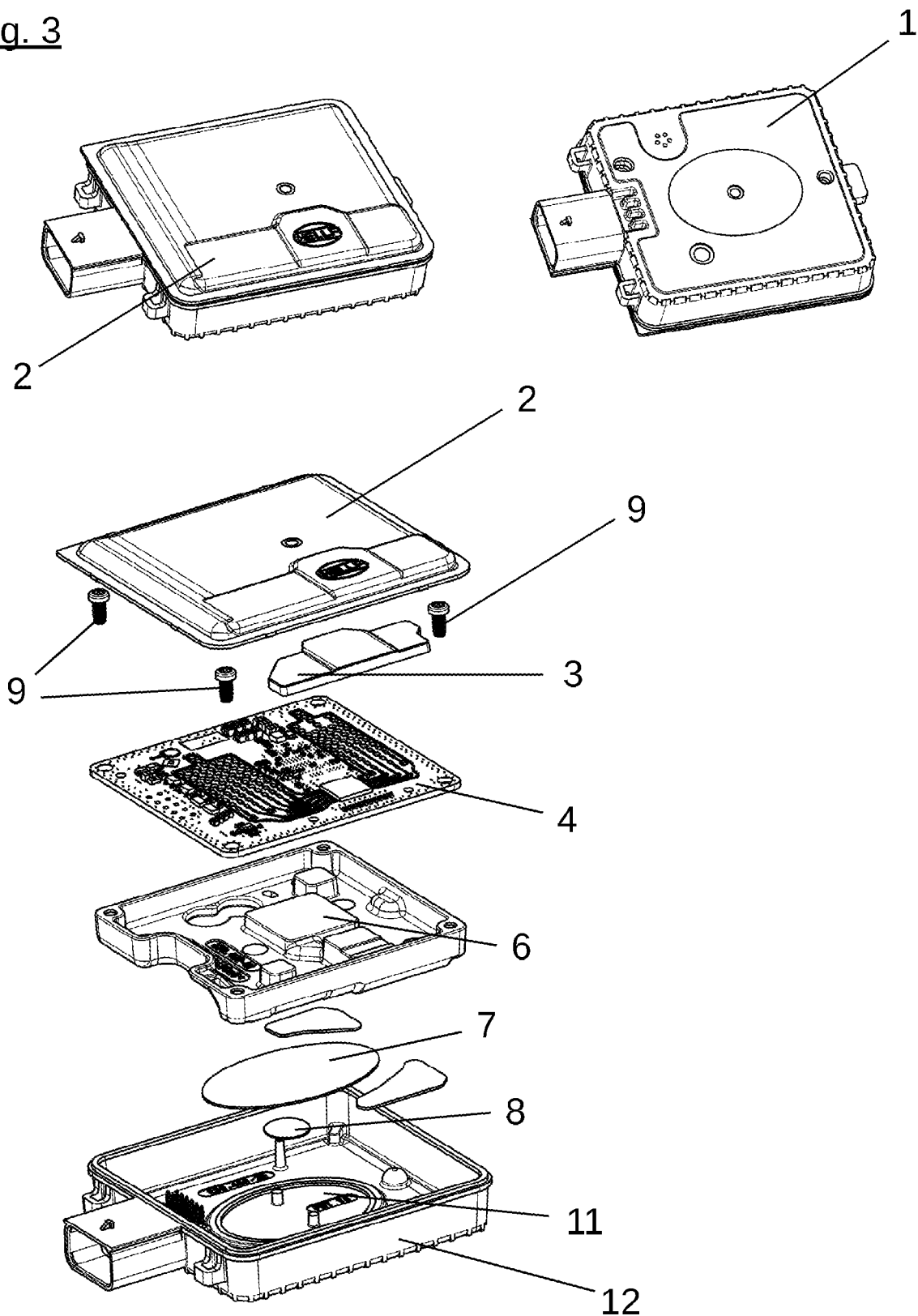
FIG. 3 is an exploded view of a second radar device in accordance with the invention.
Figure 4:
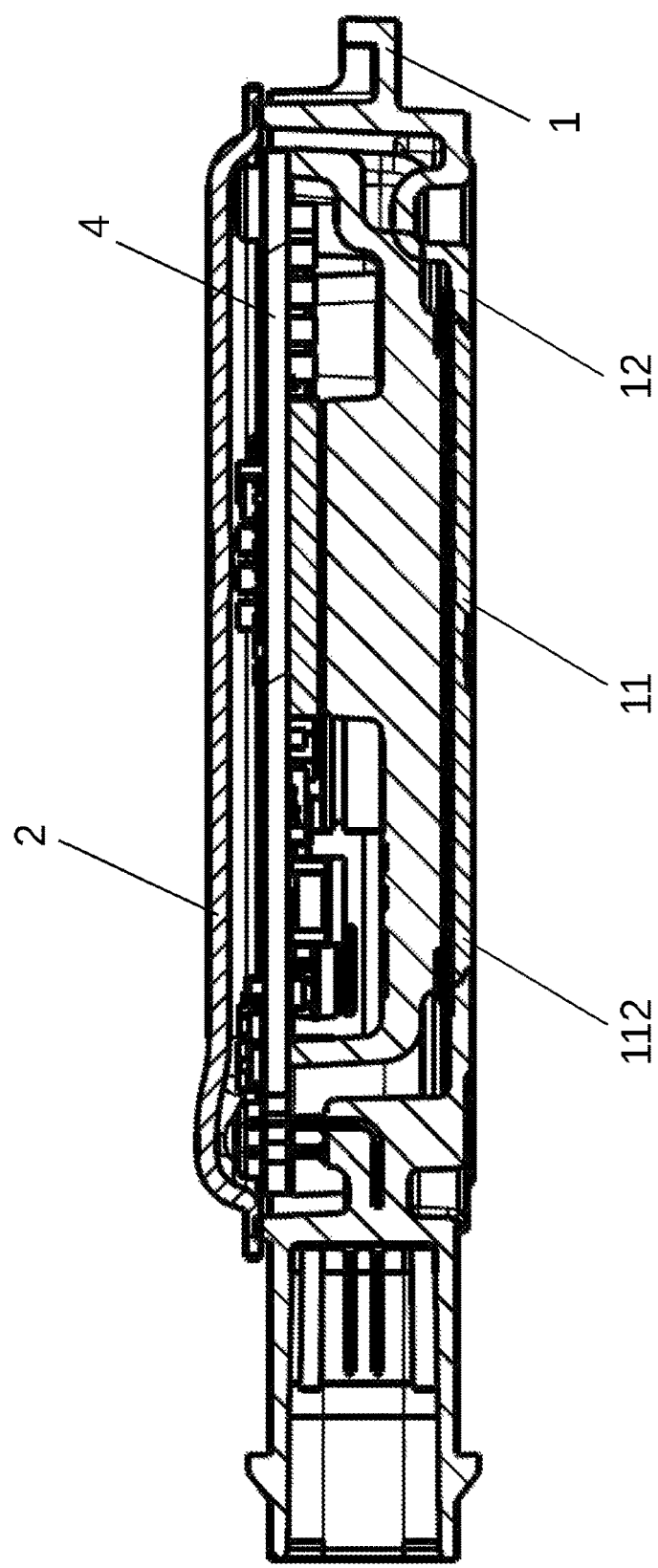
FIG. 4 is a cross-section through the second radar device.

The radar devices in accordance with the invention shown in the Figures have a housing that is composed of one first housing part 1 and a second housing part 2. In the first radar device in accordance with the invention pursuant to FIGS. 1 and 2, the first housing part 1 takes the form of a cover and the second housing part 2 as a bowl. In the second and third radar devices in accordance with the invention pursuant to FIGS. 3 through 7, the first housing part 1 takes the form of a bowl and the second housing part 2 as a cover.

On each of the bowls of the housing, there is to be a connector (identified by 21 in FIGS. 1 and 2) through which the radar device can be supplied with electrical current and through which information can be transmitted.

Figure 5:
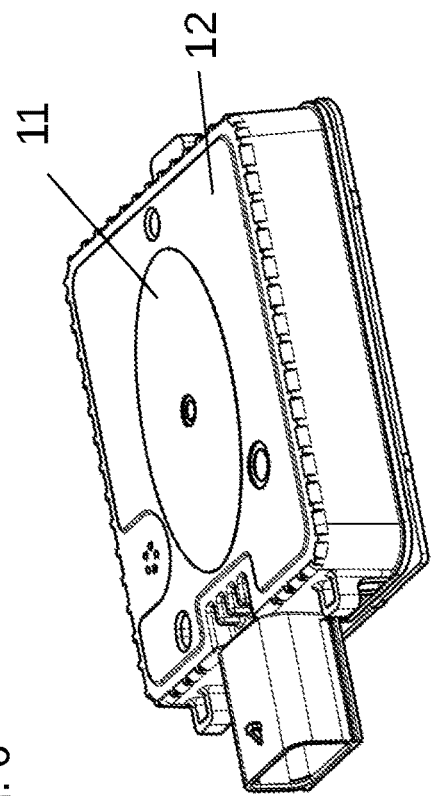
FIG. 5 is a perspective view from above onto a third radar device in accordance with the invention.
Figure 6:
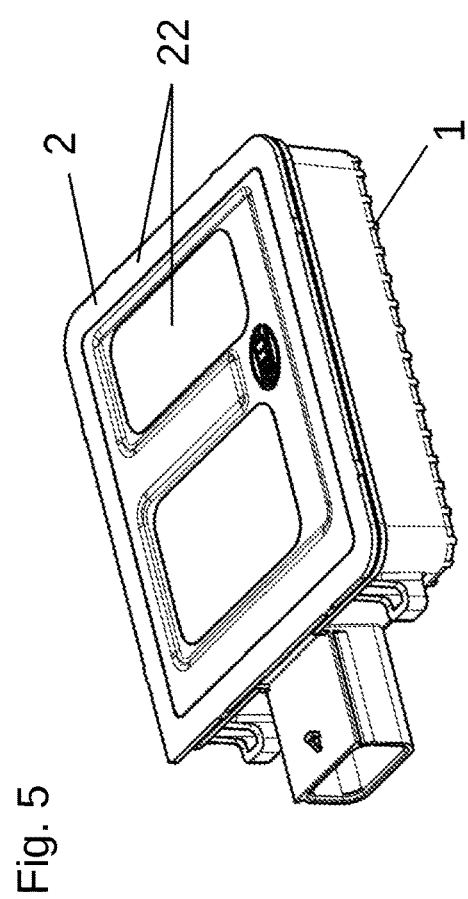
FIG. 6 is a perspective view from below of the third radar device in accordance with the invention.
Figure 7:
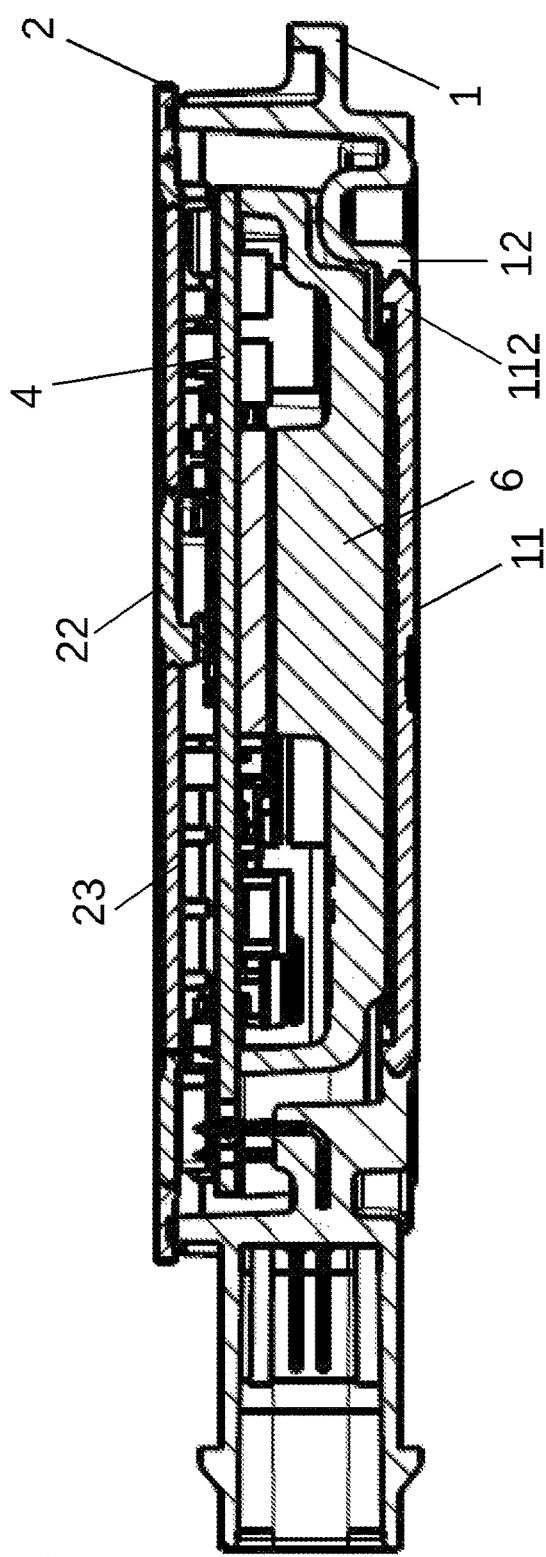
FIG. 7 is a cross-section through the third radar device.

The second housing parts of the first two radar devices take the form of radomes, which means that they are transparent for radar radiation and, where applicable, also for laser beams. The second housing part of the third radar device according to FIGS. 5 through 7 is a two-component injection molded part. It has two first areas 22 that are radar transparent and also laser transparent and a second area framing these two first areas 22 that absorbs radar radiation.

A circuit carrier 4 populated on both sides is to be located in the housing. In principle, the circuit carrier 4 can also be populated on one side. The non-populated side of the circuit carrier can be used for transmitting and/or receiving antennas.

An absorber 3 made of a plastic covered with aluminum foil is arranged in the housing between the second housing part 2 and the circuit carrier 4, which in itself is known from radar devices.

A shielding body 6 made of aluminum is to be located between the circuit carrier 4 and the first housing part 1. Such shielding bodies 6 are also known from radar devices. The shielding body 6 also acts as a thermally conductive medium by means of which heat can be dissipated from component parts on the circuit carrier 4. In order to achieve a good level of heat transfer from the component parts to the shielding body 6, gap filler and gap pads 5 can be inserted between the component parts and the shielding body 6.

The shielding body 6 is glued to a first area 11 of the first housing part 1 (bonding 7). This first area 11 of the first housing part 1 is elliptical and embedded in a second area 12 of the first housing part. The first housing part is a two-component injection-molded part. The first area has a thermal conductivity that is fivefold the thermal conductivity of the second area. Heat can be quickly dissipated from the housing through the first area. The second area 12 of the first housing part 1 may be laser transparent.

The edge 112 of the first area 11 is designed to be thicker than the inner section of the first area 11 framed by the edge 112. This makes it possible to create the connection between the first area 11 and the second area 12 in such a way that not only a firmly bonded but also a form-locking connection to the enlarged contact faces of the two areas 11 and 12 come into being.

The first housing part 1 may features domes 111, especially in the first area 11 that can serve to position and secure the area in the injection molding tool during over-molding with the second component.

The circuit carrier 4 is screwed to the shielding body 6 by means of screws 9. Preferentially, housing parts 1, 2 are laser welded.

A diaphragm 8 may be used hermetically seal off any opening in the housing. The diaphragm makes it possible to equalize pressure between the interior of the housing and the housing's environment.

LIST OF REFERENCE SYMBOLS

1 First housing part
11 First area of the first housing part
111 Domes in the first area
112 Edge of the first area
12 Second area of the first housing part
2 Second housing part
21 Connector
22 First area of the second housing part
23 Second area of the second housing part
3 Absorber
4 Circuit carrier
5 Gap filler or gap pad
6 Screening body
7 Bonding
8 Pressure equalizing diaphragm
9 Screws

The invention claimed is:

1. A radar device for a vehicle, the radar device comprising:
a housing with a first housing part and a second housing part, where the first and second housing parts are connected to each other and form boundaries of a closed recording space,
a circuit carrier accommodated within the recording space, where the circuit carrier includes at least one transmission antenna device for the transmission of radar beams and at least one receiving antenna device for receiving radar beams,
wherein the circuit carrier includes high-frequency electronic circuit devices and low-frequency electronic circuit devices,
wherein at least one of the first and second housing parts is a two-component plastic injection-molded part, where a first component of the two-component plastic injection molded part has at least a three times higher thermal conductivity than a second component of the two-component plastic injection molded part, wherein the first component of the two-component plastic injection molded part is surrounded by the second component of the two-component plastic injection molded part.

2. The radar device in accordance with claim 1, wherein the first component of the two-component plastic injection molded part is coupled to the second component of the two-component plastic injection molded part.

3. The radar device in accordance with claim 1, wherein the first component of the two-component plastic injection molded part is disk-like which, when viewed from a topside or a bottom is circular, elliptical or oval.

4. The radar device in accordance with claim 3, wherein one edge of the first component of the two-component plastic injection molded part is thicker than an inner section of the first component of the two-component plastic injection molded part separated off from the edge.

5. The radar device in accordance with claim 2, wherein the first component of the two-component plastic injection molded part features ribs on one outside surface of the housing.

6. The radar device in accordance with claim 2, wherein the second component of the two-component plastic injection molded part is laser transparent.

7. The radar device in accordance with claim 1, wherein the radar device includes, within the recording space, at least one shielding device, where the shielding device shields against electromagnetic radiation.

8. The radar device in accordance with claim 1, wherein a radar radiation absorption body is arranged within the recording space; and the absorber is formed of a radar-absorbing plastic.

9. The radar device in accordance with claim 1, wherein at least one of the two housing parts comprises a plug device that is molded in one piece to the housing part.

* * * * *